(12) United States Patent
Hoemann

(10) Patent No.: US 9,136,736 B2
(45) Date of Patent: Sep. 15, 2015

(54) MOTOR HAVING SPOKED OUTER ROTOR WITH SPACED APART POLE SEGMENTS

(71) Applicant: Nidec Motor Corporation, St. Louis, MO (US)

(72) Inventor: Keith I. Hoemann, Fenton, MO (US)

(73) Assignee: Nidec Motor Corporation, St. Louis, MO (US)

( * ) Notice: Subject to any disclaimer, the term of this patent is extended or adjusted under 35 U.S.C. 154(b) by 278 days.

(21) Appl. No.: 13/911,882

(22) Filed: Jun. 6, 2013

(65) Prior Publication Data

US 2013/0328432 A1 Dec. 12, 2013

Related U.S. Application Data

(60) Provisional application No. 61/691,155, filed on Aug. 20, 2012, provisional application No. 61/656,325, filed on Jun. 6, 2012.

(51) Int. Cl.
*H02K 21/12* (2006.01)
*H02K 1/27* (2006.01)
*H02K 1/30* (2006.01)

(52) U.S. Cl.
CPC .............. *H02K 1/2786* (2013.01); *H02K 1/30* (2013.01); *H02K 1/278* (2013.01)

(58) Field of Classification Search
CPC ... H02K 1/278; H02K 1/2773; H02K 1/2786; H02K 15/03; H02K 7/14
USPC .................................................. 310/156.12
See application file for complete search history.

(56) References Cited

U.S. PATENT DOCUMENTS

| 5,250,867 A | 10/1993 | Gizaw |
| 6,262,508 B1 | 7/2001 | Shibayama et al. |
| 6,703,741 B1 | 3/2004 | Ifrim |
| 6,753,632 B1 | 6/2004 | Hartsfield, Jr. |

(Continued)

FOREIGN PATENT DOCUMENTS

| JP | 2001258189 A | 9/2001 |
| KR | 2020090007370 U | 7/2009 |

(Continued)

OTHER PUBLICATIONS

PCT International Search Report and Written Opinion from PCT Application No. PCT/US2013/044593 entitled Motor Having Spoked Outer Rotor With Spaced Apart Pole Segments (Dated Nov. 21, 2013).

*Primary Examiner* — Hanh Nguyen
(74) *Attorney, Agent, or Firm* — Hovey Williams LLP

(57) ABSTRACT

An electric motor is provided. The electric motor comprises a stator and a rotor rotatable about an axis and spaced at least in part radially outside the stator. The rotor includes a plurality of arcuately spaced apart pole segments, a plurality of arcuately spaced apart magnets alternately arranged with the pole segments such that each of the pole segments is positioned between an adjacent pair of the magnets, a rotor can at least in part supporting the pole segments and the magnets, and a plurality of pegs. Each of the pole segments defines an opening therethrough and includes a generally arcuately extending wall structure positioned radially outside of and at least in part defining the opening. Each of the pegs extends through a corresponding one of the openings to secure a corresponding one of the pole segments relative to the can.

24 Claims, 12 Drawing Sheets

(56) References Cited

U.S. PATENT DOCUMENTS

| | | |
|---|---|---|
| 7,103,961 B2 | 9/2006 | Fujita |
| 7,157,827 B2 | 1/2007 | Heideman et al. |
| 7,352,101 B2 | 4/2008 | Fujita |
| 7,468,570 B2 | 12/2008 | Ionel et al. |
| 7,548,006 B2 * | 6/2009 | Yu .......................... 310/156.12 |
| 7,755,244 B2 | 7/2010 | Ley et al. |
| 8,593,027 B2 * | 11/2013 | Marchitto et al. ....... 310/156.12 |
| 2003/0062792 A1 | 4/2003 | Reiter, Jr. et al. |
| 2003/0085629 A1 * | 5/2003 | Van Dine et al. ........ 310/156.08 |
| 2006/0091754 A1 | 5/2006 | Kim et al. |
| 2006/0097601 A1 | 5/2006 | Hauger |
| 2006/0175923 A1 * | 8/2006 | Abou Akar et al. ............ 310/114 |
| 2009/0302717 A1 | 12/2009 | Hoffman |
| 2012/0043844 A1 | 2/2012 | Bailey et al. |
| 2012/0104879 A1 | 5/2012 | Ramu |
| 2012/0112591 A1 | 5/2012 | Feuerrohr et al. |
| 2012/0206008 A1 | 8/2012 | Blanc et al. |
| 2013/0009508 A1 | 1/2013 | Takamatsu et al. |
| 2013/0038161 A1 | 2/2013 | Pan |
| 2013/0057103 A1 | 3/2013 | Han et al. |
| 2014/0103769 A1 * | 4/2014 | Kingrey et al. .......... 310/156.12 |

FOREIGN PATENT DOCUMENTS

| | | |
|---|---|---|
| KR | 101097398 B1 | 12/2011 |
| WO | 0165663 A1 | 9/2001 |
| WO | 2013047979 A1 | 4/2013 |
| WO | 2013053479 A1 | 4/2013 |
| WO | 2013057673 A2 | 4/2013 |
| WO | 2013060960 A2 | 5/2013 |

* cited by examiner ial Application No. 61/656,325, filed Jun. 6, 2012, and
MOTOR HAVING SPOKED OUTER ROTOR WITH SPACED APART POLE SEGMENTS

CROSS-REFERENCE TO RELATED APPLICATIONS

The present application claims priority from U.S. Provisional Application No. 61/656,325, filed Jun. 6, 2012, and U.S. Provisional Application No. 61/691,155, filed Aug. 20, 2012, the entire disclosures of both of which are hereby incorporated by reference herein.

BACKGROUND OF THE INVENTION

1. Field of the Invention

The present invention relates generally to electric motors comprising a rotor and a stator. More particularly, the present invention concerns outer rotor motors, wherein the rotor is of a spoked design and includes spaced apart pole segments.

2. Discussion of the Prior Art

Those of ordinary skill in the art will appreciate that electric motors are often used in machines such as vertical- or horizontal-axis washing machines, electric bicycles, and electric scooters. Fan, generators, and exercise equipment may also use electric motors. In many circumstances, design constraints include both performance requirements and space requirements.

SUMMARY

According to one aspect of the present invention, an electric motor is provided. The electric motor comprises a stator and a rotor rotatable about an axis and spaced at least in part radially outside the stator. The rotor includes a plurality of arcuately spaced apart pole segments, a plurality of arcuately spaced apart magnets alternately arranged with the pole segments such that each of the pole segments is positioned between an adjacent pair of the magnets, a rotor can at least in part supporting the pole segments and the magnets, and a plurality of pegs. Each of the pole segments defines an opening therethrough and includes a generally arcuately extending wall structure positioned radially outside of and at least in part defining the opening. Each of the pegs extends through a corresponding one of the openings to secure a corresponding one of the pole segments relative to the can.

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with regard to the attached drawing figures, wherein.

Figure 8:
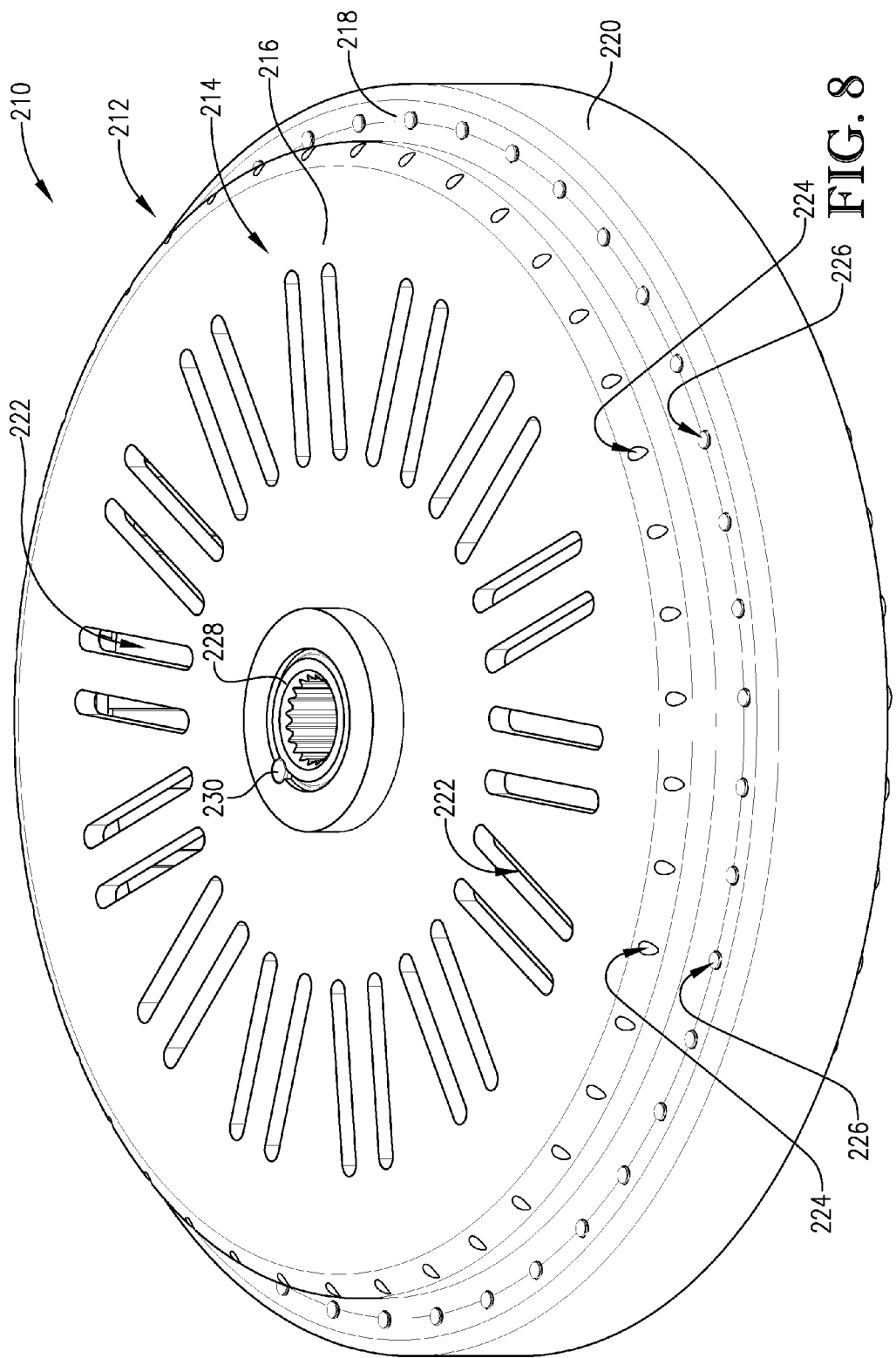
FIG. 8 is a bottom perspective view of a portion of a rotor in accordance with a second preferred embodiment of the present invention.
Figure 9:
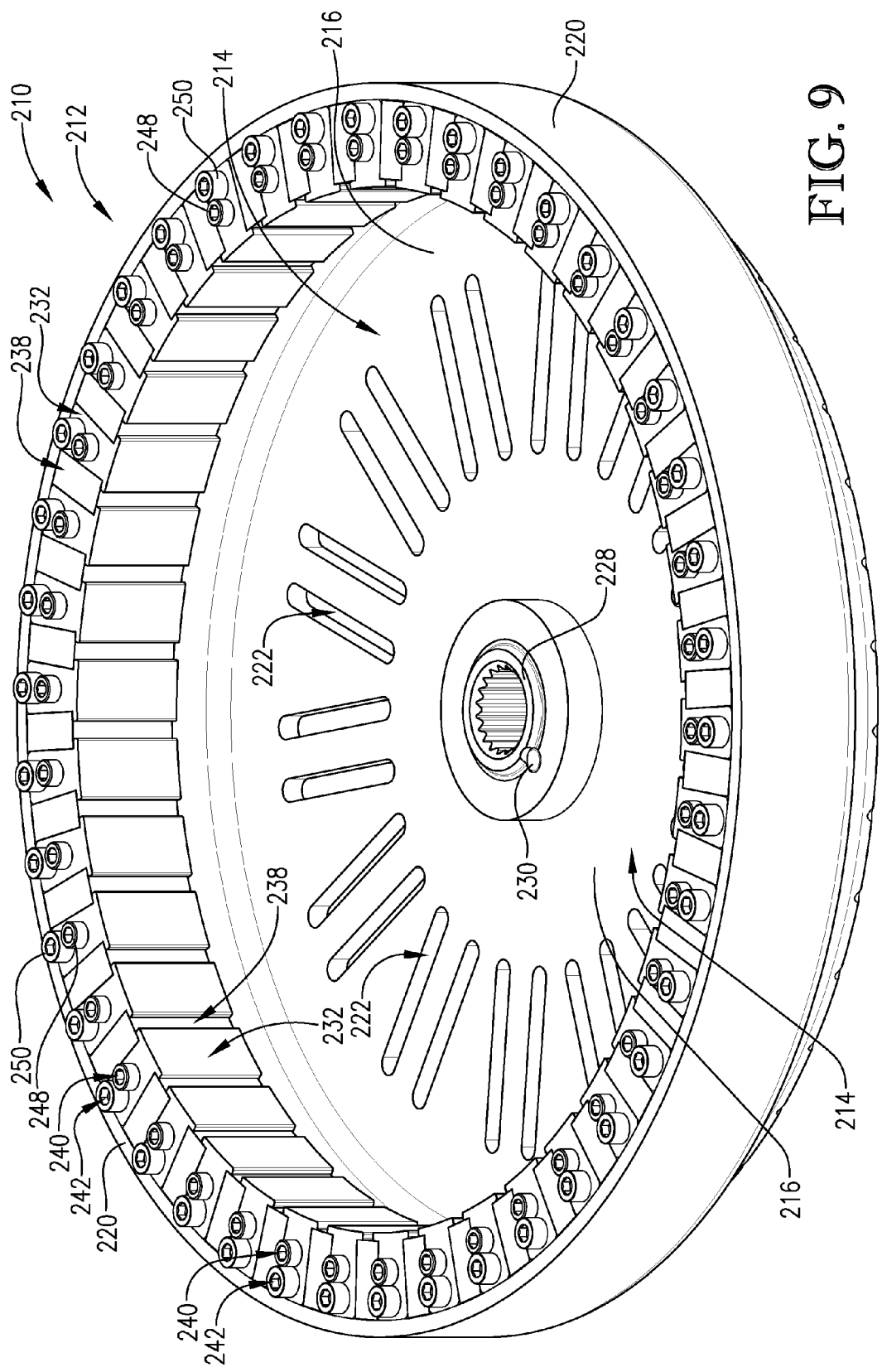
FIG. 9 is a top perspective view of the rotor portion of FIG. 8.
Figure 11:
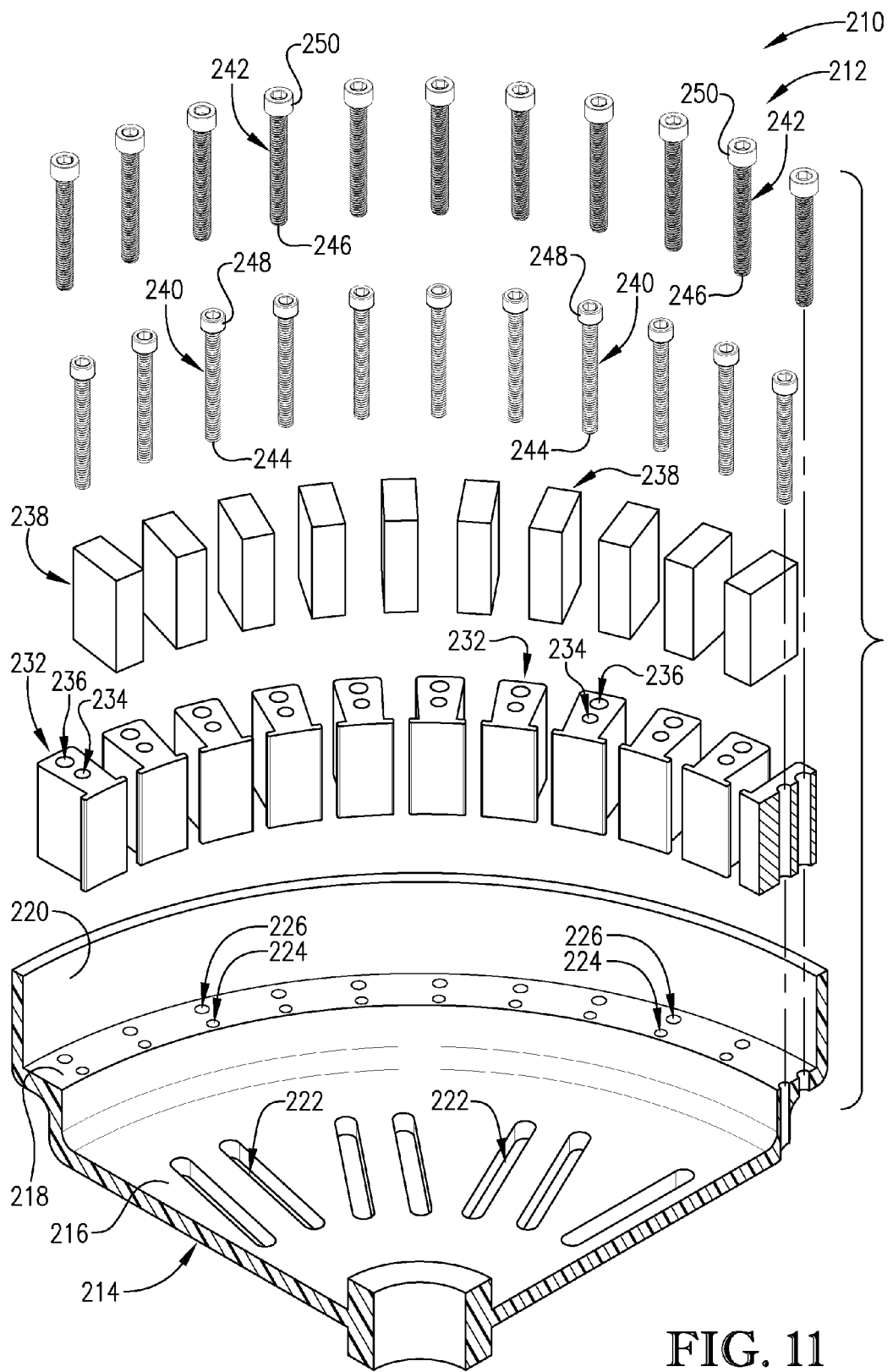
Figure 12:
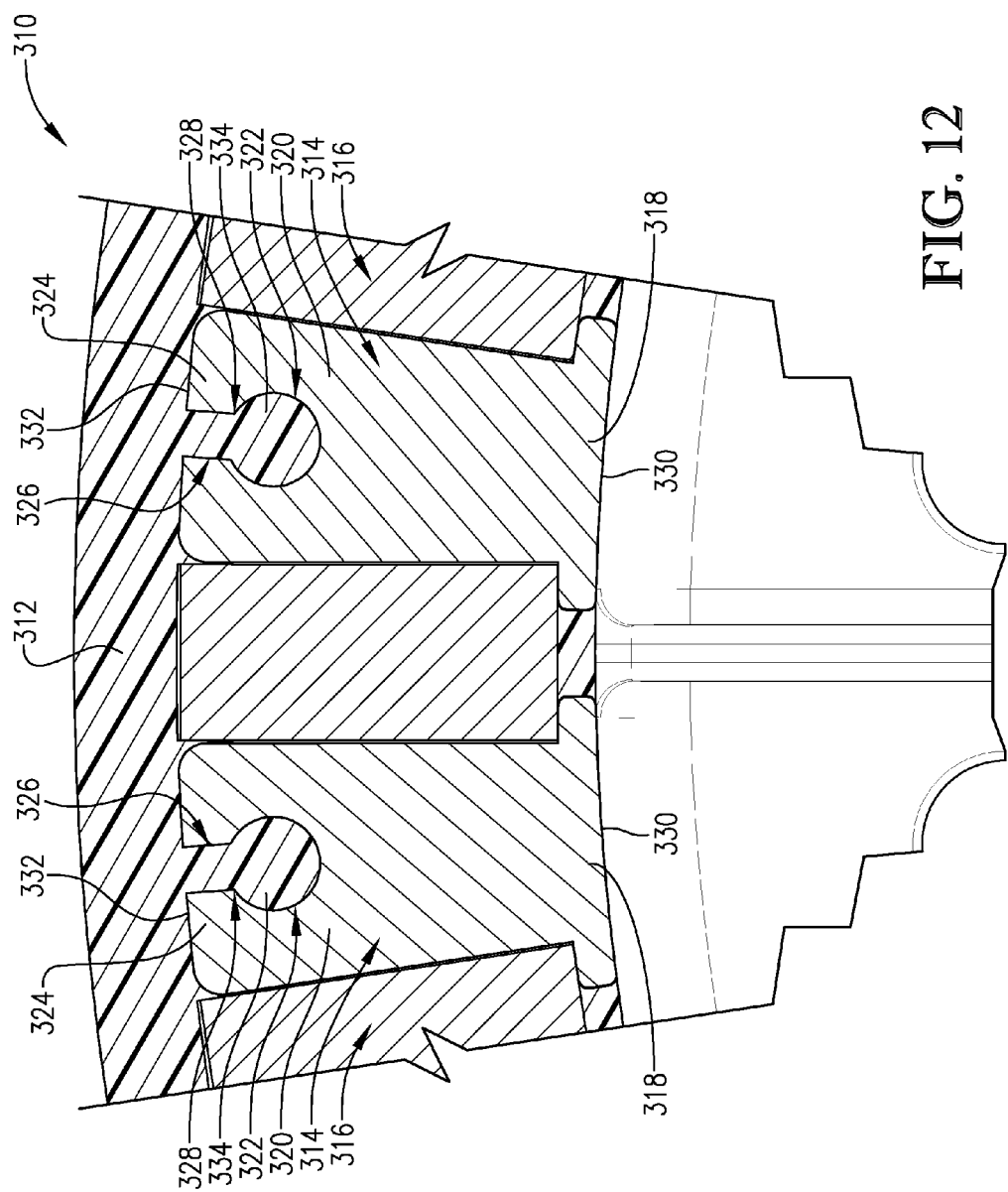

FIG. 11 is a partially sectioned, exploded view of a part of the rotor portion of FIGS. 8 and 9, particularly illustrating the spacing and arrangement of the pole segments and magnets and the means of securing the pole segments and magnets; and FIG. 12 is a partially sectioned top view of a part of a rotor in accordance with a third preferred embodiment of the present invention, particularly illustrating keyhole openings in the pole segments.

The drawing figures do not limit the present invention to the specific embodiments disclosed and described herein. The drawings are not necessarily to scale, emphasis instead being placed upon clearly illustrating the principles of the preferred embodiments.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Figure 1:
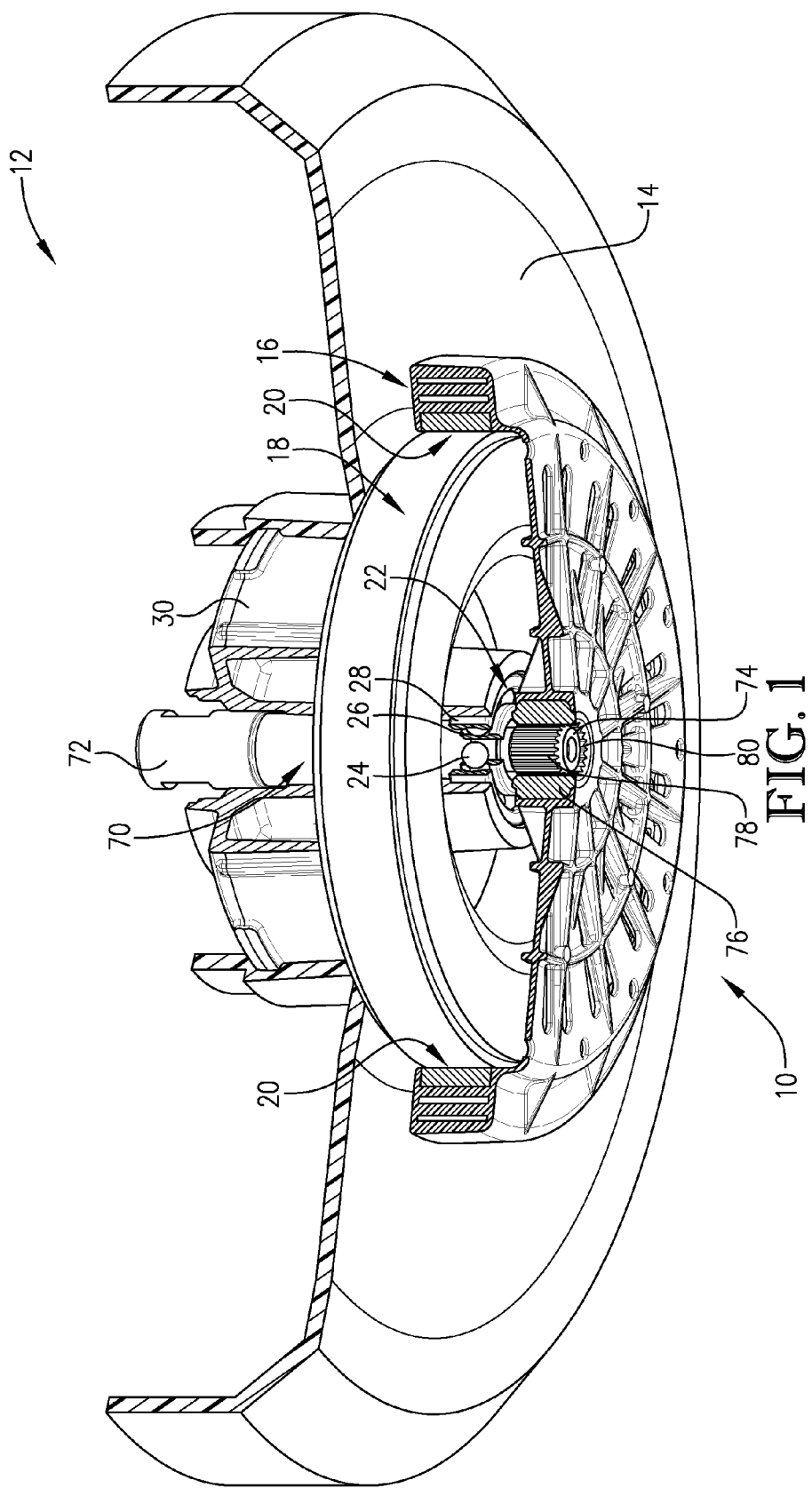
FIG. 1 is a partial sectional bottom perspective view of a portion of a machine constructed in accordance with the principles of a preferred embodiment of the present invention, depicting a portion of a washing machine and an outer rotor electric motor that includes, among other things, a rotor and a stator.

With initial reference to FIG. 1, an electric motor 10 constructed in accordance with a first preferred embodiment of the present invention is depicted for use in a machine 12. Although a variety of machines are suitable, as noted above, the particular machine depicted in FIG. 1 is a washing mashing having a stationary tub 14 and a rotatable washer or agitator basket (not shown).

As is customary, the motor 10 broadly includes a rotor 16 and a stator 18 (shown schematically) spaced partially inside the rotor 16 so that a circumferentially extending gap 20 is defined between the rotor 16 and the stator 18. Preferably, the rotor 16 is rotationally supported on the tub 14 by a bearing assembly 22. In the preferred embodiment shown in FIG. 1, the bearing assembly 22 includes a plurality of ball bearings 24 disposed between an inner race 26 and an outer race 28, although a different bearing type or an entirely different rotation isolation mechanism could be used to similar effect without departing from the spirit of the present invention.

The stator 18, though shown only schematically in FIG. 1, preferably comprises a core and a plurality of coils wound around the core. The core preferably comprises a plurality of arcuately spaced apart, radially extending teeth. The core may be arcuately or circumferentially continuous or discontinuous. The teeth are preferably of a laminated design, although it is with the scope of the present invention for integrally formed teeth to be provided. A wide variety of tooth shapes fall within the scope of the invention.

The coils preferably comprise electrically conductive wiring. The wiring preferably comprises aluminum wiring, although copper or another electrically conductive material could also be used without departing from the scope of the present invention. In the preferred embodiment, the stator core is at least partly coated with an electrically insulative coating, preferably a powder coating. One suitable powder coating material is available from 3M™ under the designation Scotchcast™ Electrical Resin 5555. However, it is within the scope of the present invention for the stator core to be insulated with other electrically insulative coatings or use other insulation arrangements such as electrically non-conductive tabs or overlays.

Preferably, mounting structure (not shown) is provided to fix the stator 18 to the machine 12 and to support it thereon. In the first illustrated embodiment, the stator 18 is mounted onto the machine 12 via fixation to a tub mounting hub 30. The stator may be mounted in any suitable manner, including those manners disclosed in U.S. patent application Ser. Nos. 13/312,723, 13/358,319, and 13/451,786, each of which is assigned of record to the assignee of the present application and is incorporated in its entirety by reference herein.

Figure 2:
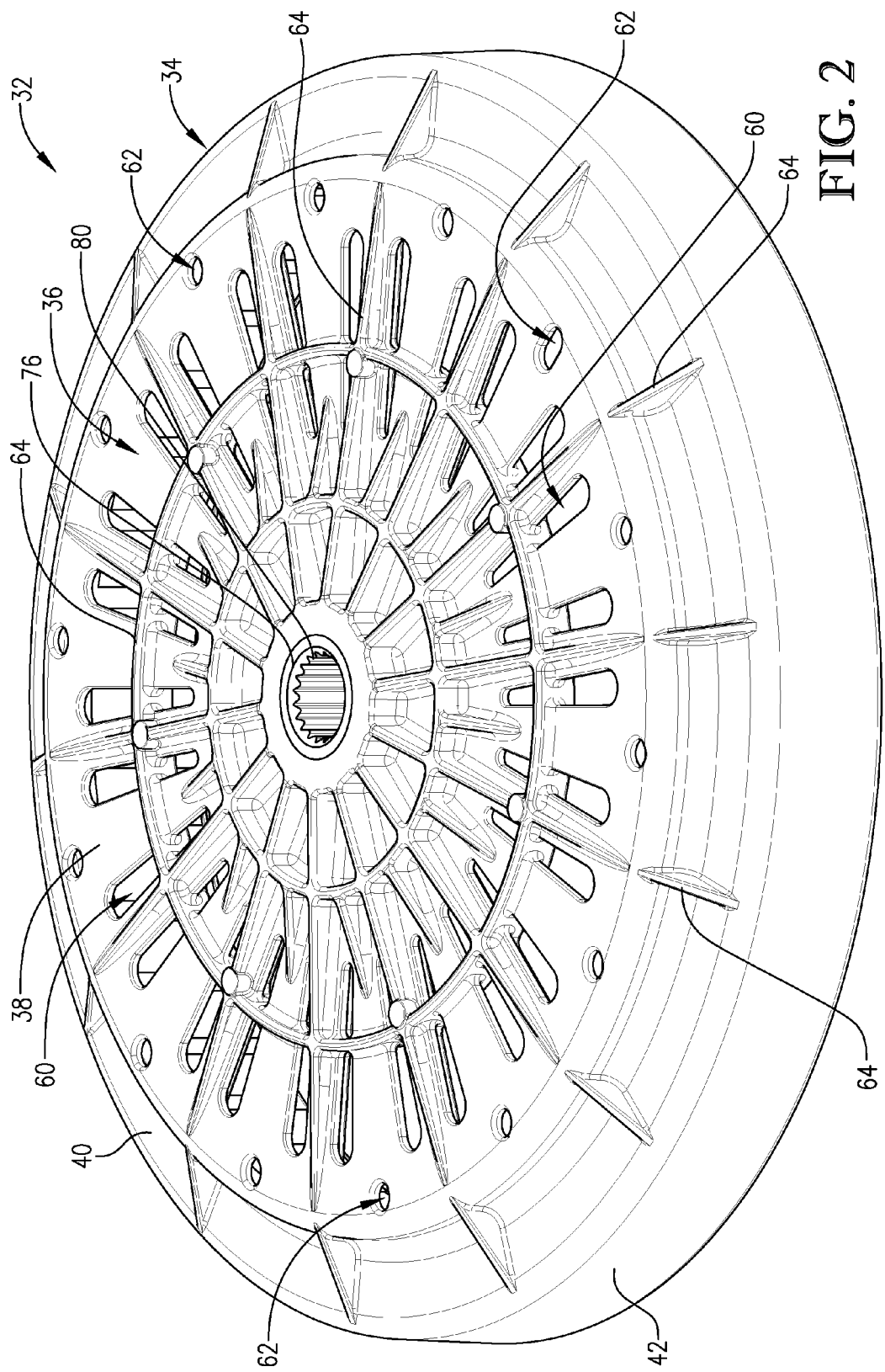
FIG. 2 is a bottom perspective view of a portion of the rotor of FIG. 1.
Figure 3:
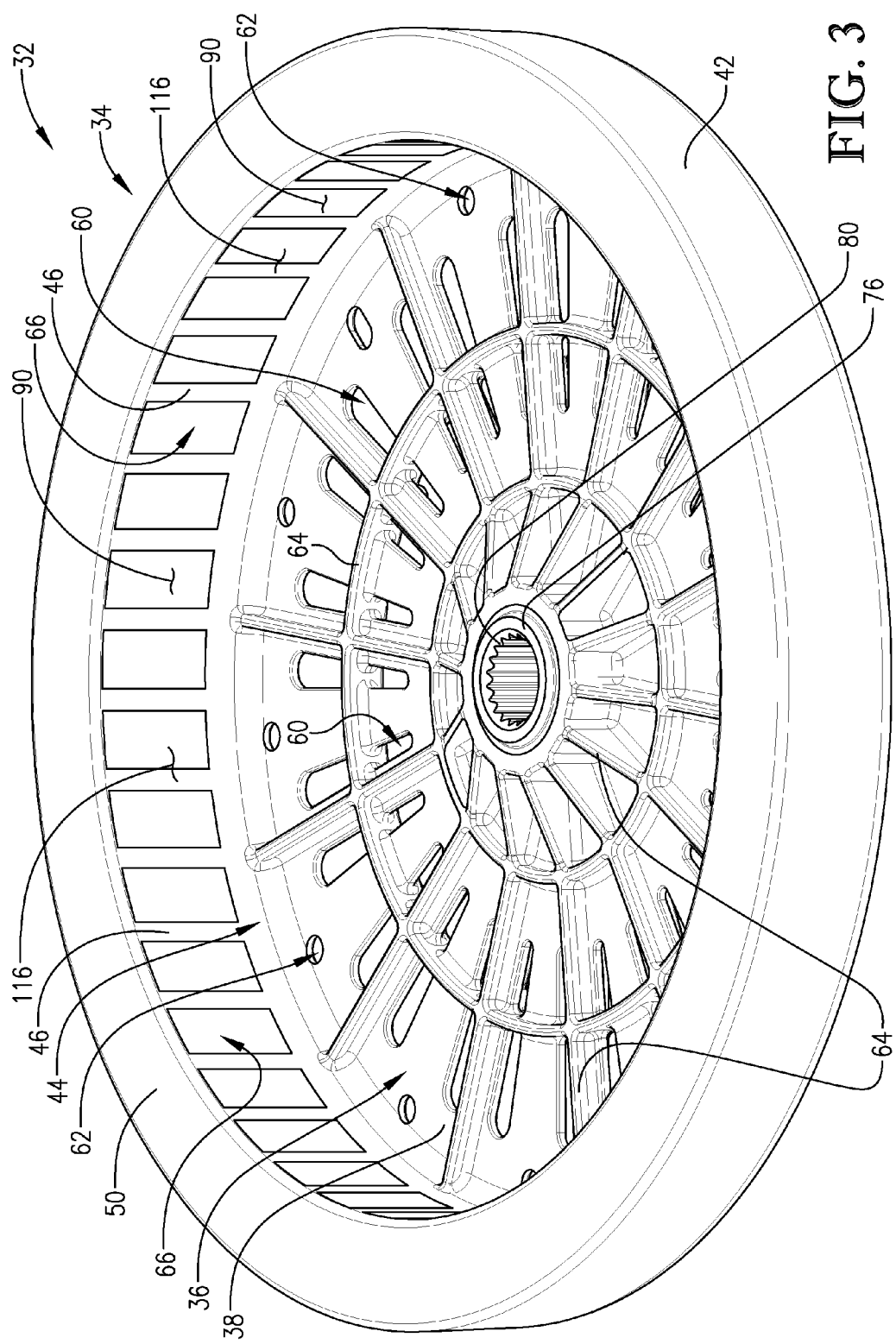
FIG. 3 is a top perspective view of the rotor portion of FIG. 2.
Figure 4:
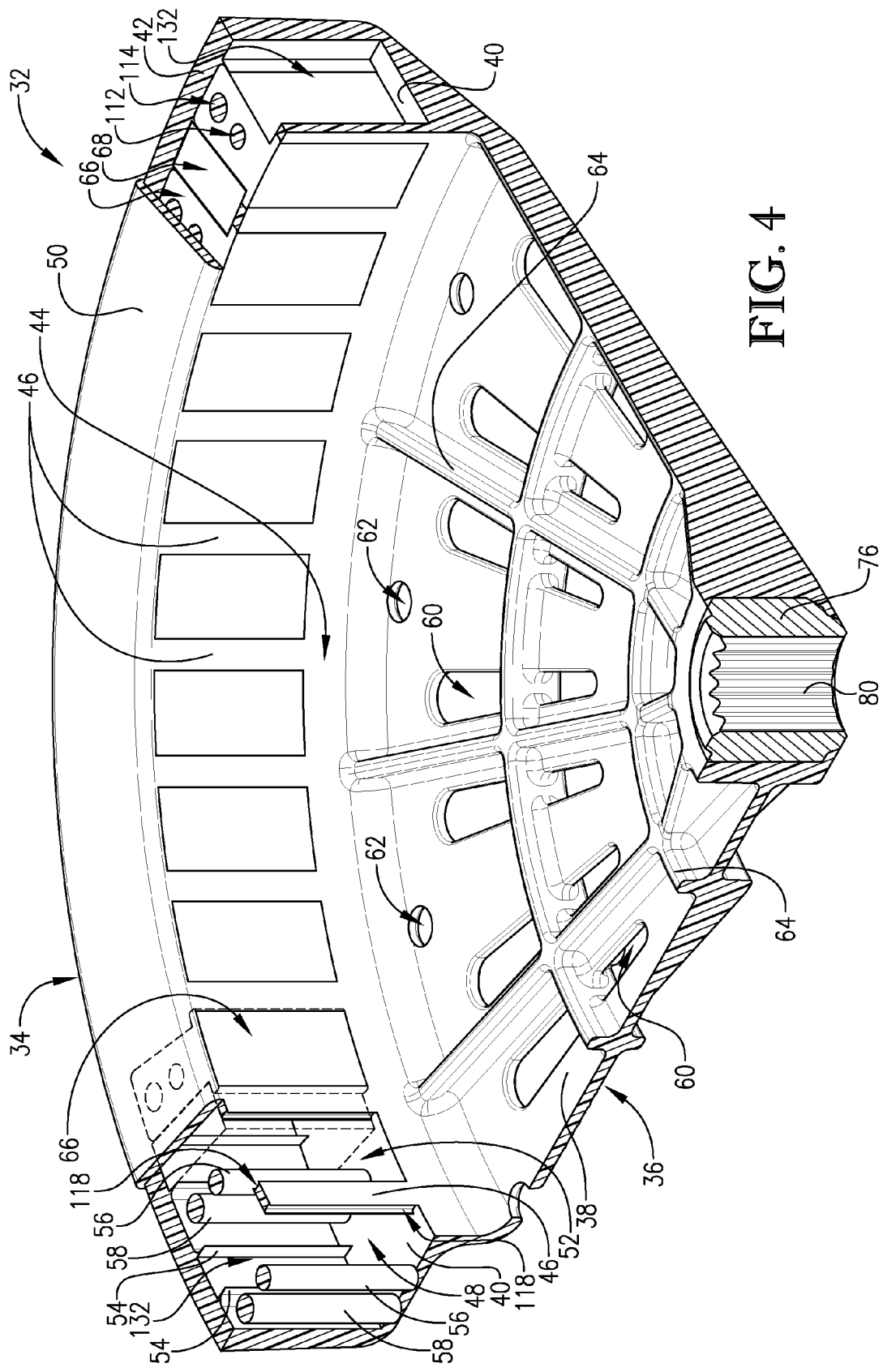
FIG. 4 is a partially sectioned view of the rotor portion of FIGS. 2 and 3, particularly illustrating the means of spacing and securing the pole segments and magnets.

A portion 32 of the rotor 16 is shown in FIGS. 2-4. The rotor portion 32 includes a rotor can 34 that includes a radially projecting spoked base 36. The base 36 preferably includes a central plate 38 and an annular elevated floor 40. The rotor can 34 further includes a circumferentially extending outer support wall 42 and a discontinuous, circumferentially extending inner support wall 44 comprising a plurality of substantially rectangular columns 46 that are preferably formed during the molding of the rotor can 34. Formation of the columns 46 will be discussed in greater detail below.

Preferably, both of the support walls 42,44 project axially upwardly from the floor 40, with the floor 40 and the support walls 42,44 thus defining a channel 48, as best shown in FIG. 4. An annular top wall 50 extends between the inner and outer support walls 42,44 to enclose the channel 48, with the exception of a plurality of windows 52, each of which is bounded by a pair of the columns 46, the floor 40, and the top wall 50.

In the illustrated first embodiment, the rotor can 34 further includes a plurality of arcuately spaced apart dividers 54 extending radially inwardly from the outer support wall 42, as well as a plurality of axially extending, arcuately spaced apart inner positioning pegs 56 and a plurality of axially extending, arcuately spaced apart outer positioning pegs 58. Like the columns 46, the pegs 56,58 and the dividers 54 are preferably formed during the molding of the rotor can 34, as will be discussed in greater detail below. However, as will also be discussed in more detail below, it is permissible according to certain aspects of the present invention for the pegs to be discrete fasteners formed independently from the rotor can.

In the first embodiment, the central plate 38 of the rotor can 34 also preferably includes a plurality of ventilation slots 60 and ventilation apertures 62. It is also preferable that a plurality of support ribs 64 are formed as part of the central plate 38. In addition to functioning as structural supports, the ribs 64 may also be configured in such a manner as to provide cooling assistance for the motor 10 by disturbing nearby air.

The rotor can 34 of the first preferred embodiment preferably comprises a plastic material such as polypropylene, although any one or more of a variety of other materials may be used without departing from the scope of the present invention. For instance, as will be discussed in more detail below, it is preferable according to some embodiments of the present invention that the can be formed of aluminum.

It is also permissible and in some instances preferred that the material of the rotor can 34 include reinforcing fibers such as glass fibers, although use of other reinforcement techniques or use of no additional reinforcement is within the scope of the present invention.

Figure 5:
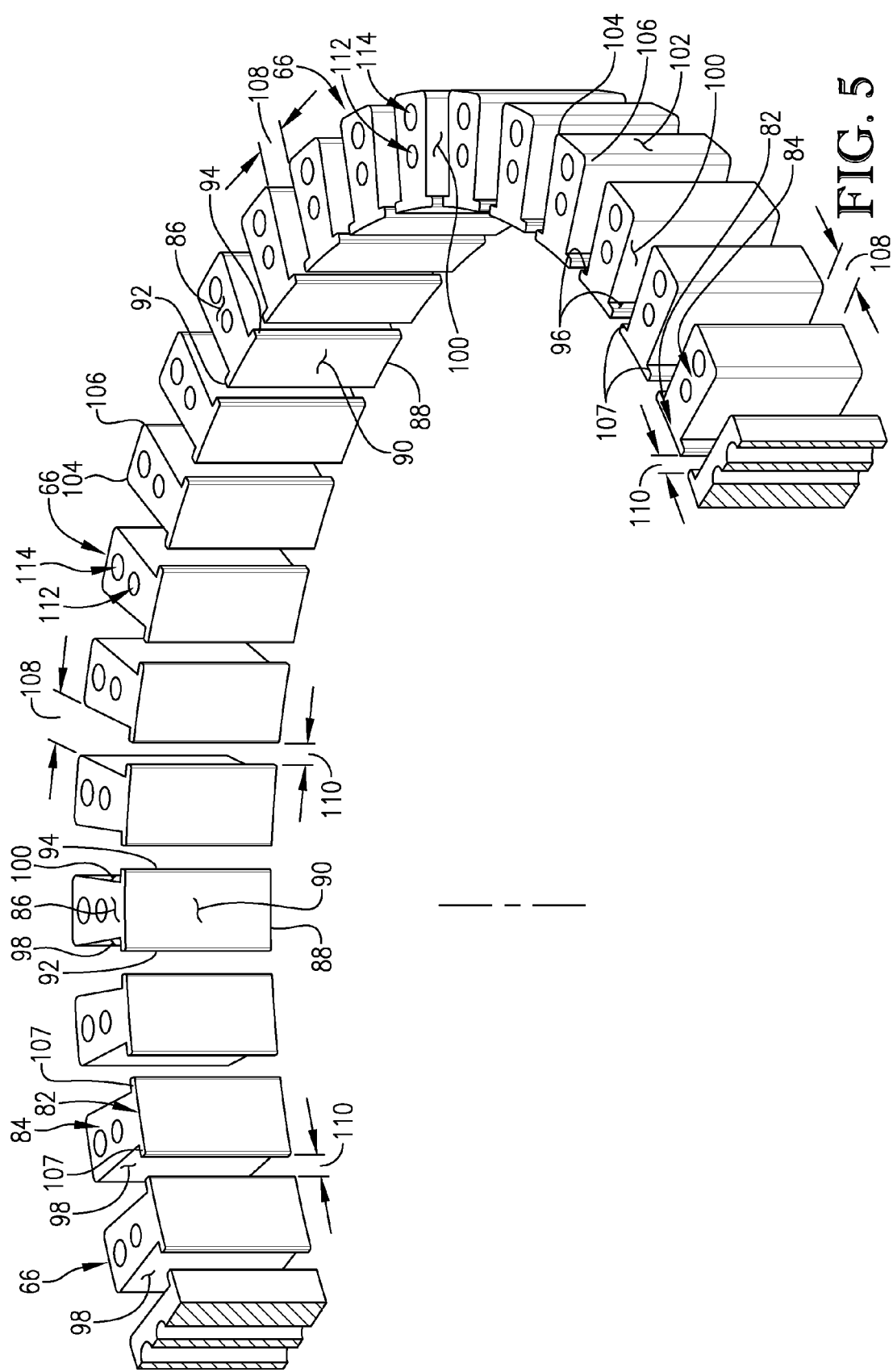
FIG. 5 is a partially sectioned view of a part of the rotor portion of FIGS. 2 and 3, particularly illustrating the spacing and arrangement of the pole segments.
Figure 6:
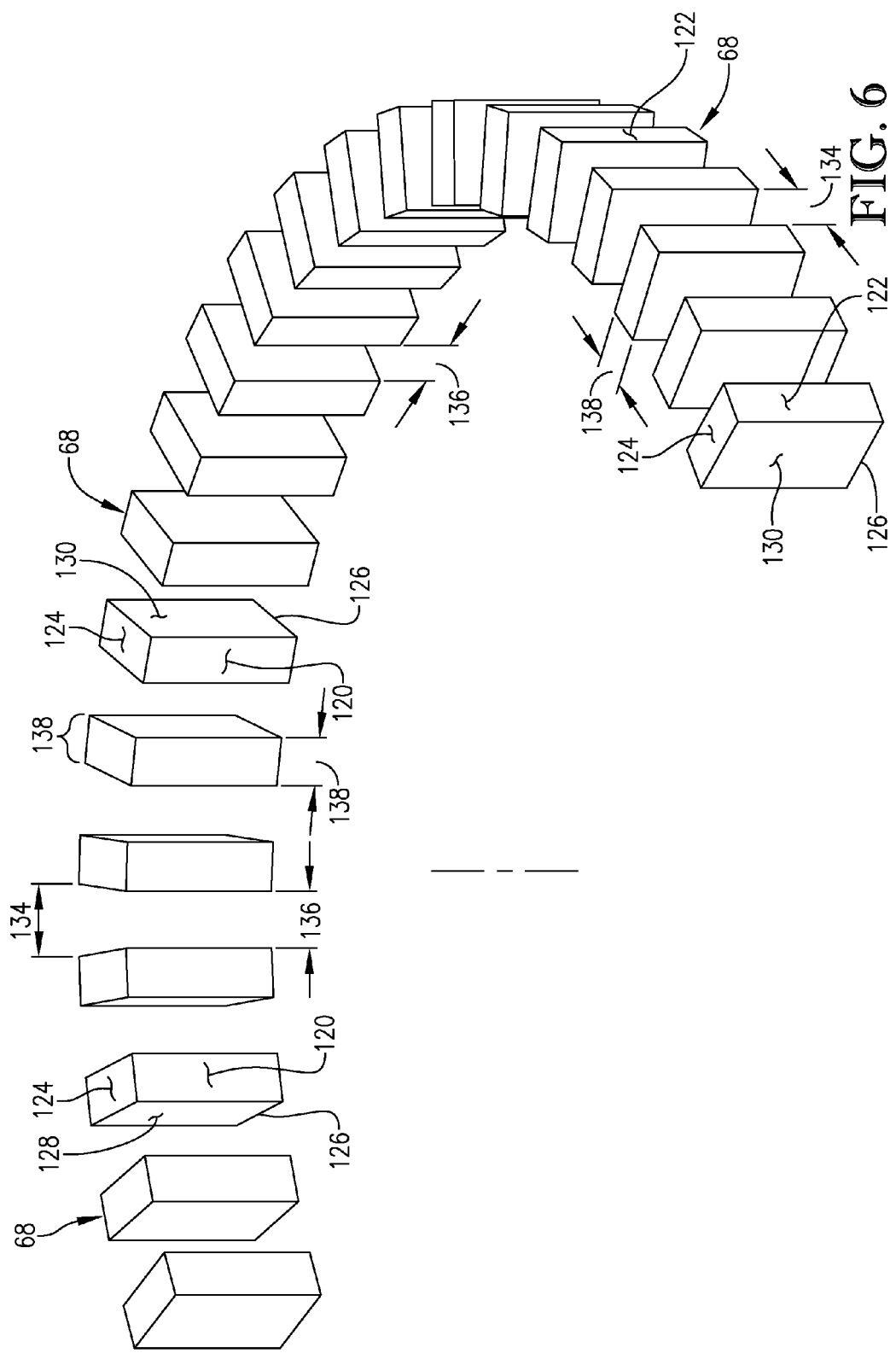
FIG. 6 is a partially sectioned view of a part of the rotor portion of FIGS. 2 and 3, particularly illustrating the spacing and arrangement of the magnets.

As best shown in FIGS. 4 and 5, the rotor 16 preferably includes a plurality of arcuately spaced apart, radially extending pole segments 66. Furthermore, as best shown in FIGS. 4 and 6, the rotor 16 preferably includes a plurality of arcuately spaced apart, radially extending permanent magnets 68. As used herein, "spaced" or "spaced apart" with reference to the pole segments should be interpreted as meaning that adjacent pole segments do not directly contact each other. Likewise, "spaced" or "spaced apart" with reference to the magnets should be interpreted as meaning that adjacent magnets do not directly contact each other. The spacing of the pole segments and magnets will be discussed in greater detail below.

The pole segments 66 and the magnets 68 are preferably alternately arranged in a circumferential direction. That is, a pole segment 66 is located between each adjacent pair of magnets 68, and vice versa. Furthermore, the magnets 68 are preferably arranged such that adjacent magnets present oppositely oriented polarities, with the poles being oriented generally perpendicular to the radial direction. As shown in FIG. 6, for instance, the north pole N of a magnet 68a is oriented to face the north pole N of a first adjacent magnet 68b. The south pole S of the magnet 68a is oriented to face the south pole S of a second adjacent magnet 68c.

Preferably, the rotor can 34 of the first preferred embodiment is overmolded over and around the pole segments 66 and the magnets 68 so as to secure them in their appropriate positions. The dividers 54, the positioning pegs 56 and 58, and the columns 46 therefore conform to the geometry of the pole segments 66 and the magnets 68 when the molded material sets.

Preferably, as best shown in FIG. 1, the base 36 is configured for connection of the rotor can 34 to a rotatable shaft 70. In the first embodiment, the shaft 70 includes a machine connection end 72 and a rotor connection end 74. The rotor connection end 74 is configured for engagement with a coupler 76. In the first preferred embodiment, such engagement is effected by the interaction of the outer splines 78 on the rotor connection end 74 and the inner splines 80 on the coupler 76. The coupler 76 also engages the base 36 of the rotor can 34, such that the rotor can 34, the coupler 76, and the shaft 70 all rotate together about a single axis of rotation. Although a single axis of rotation is preferable, it is with the scope of the present invention for multiple axes of rotation to be defined.

As shown in FIG. 4, engagement between the base 36 and the coupler 76 is preferably by means of the preferred overmolding fabrication process. Although not shown, the outer surface of the coupler 76 is preferably splined to enhance the connection. However, the base 36 and coupler 76 may alternatively be interconnected, such as by a press fit or adhesive connection. Yet further, a variety of engagement means, whether implemented between the coupler 76 and the shaft 70 or between the coupler 76 and the rotor can 34, are acceptable.

For instance, interference screws, press fits, or adhesives could all be used, either singly or in combination.

Turning again to FIGS. 4 and 5, each pole segment 66 of the rotor 16 preferably comprises steel or any one or more of a variety of magnetically conductive materials. Furthermore, each pole segment 66 preferably includes a radially innermost section 82 and a radially outermost section 84, with the sections 82,84 collectively presenting axially spaced apart upper and lower faces 86 and 88, respectively. The radially innermost section 82 preferably extends substantially arcuately relative to the radially outermost section 84 and presents a radially innermost face 90, a pair of side edges 92 and 94, and a discontinuous intermediate face 96. The radially outermost section 84 extends substantially radially outwardly from the intermediate face 96 and preferably presents a pair of side faces 98 and 100 that intersect a radially outermost face 102 at respective corners 104 and 106. Thus, a pair or shelves 107 are formed by the radially innermost section 82 adjacent the side faces 98 and 100.

Preferably, each radially outermost section 84 is generally trapezoidal in shape, although any one or more of a variety of shapes are permissible. It is also permissible according to some aspects of the present invention for the radially outermost sections 84 to be identically configured or to vary from one another.

In the illustrated first embodiment, the edges 92,94 and corners 104,106 are chamfered or rounded. However, it is within the scope of the present invention for sharp or otherwise configured edges and corners to be formed. Furthermore, for reasons including but not limited to the reduction of cogging torques, it is also within the scope of the present invention for a variety of shape modifications to be applied to the pole segments 66.

As best shown in FIG. 5, the pole segments 66 are preferably evenly spaced from each other along an arcuate path. A spacing distance 108 is defined between the adjacent side faces 98,100 of each adjacent pair of radially outermost sections 82; and a spacing dimension 110 is defined between adjacent side edges 92,94 of each adjacent pair of radially innermost sections 82. The spacing distance 108 is preferably greater than the spacing dimension 110.

Furthermore, it is preferable according to the first preferred embodiment of the present invention that the width (in a substantially arcuate direction) of each pole segment 66 is, at all radial positions, greater than both the spacing distance 108 and the spacing dimension 110. However, it is permissible according some aspects of the present invention for the pole segment 66 to have a width that is smaller than one or both of the spacing distance 108 and the spacing dimension 110.

In addition to the above features, it also is preferred that each pole segment 66 includes an inner positioning hole or opening 112 and an outer positioning hole or opening 114. As best shown in FIG. 4, each positioning hole 112,114 corresponds with one of the inner or outer positioning pegs 56,58, respectively, with the pegs 56,58 being formed within the corresponding positioning holes 112,114 by inflow of the rotor can material during the molding process of the rotor can 34. Such formation of the pegs 56,58 within corresponding positioning holes 112,114 ensures that both radial and circumferential movements of the associated pole segments 66 are restricted.

Figure 7:
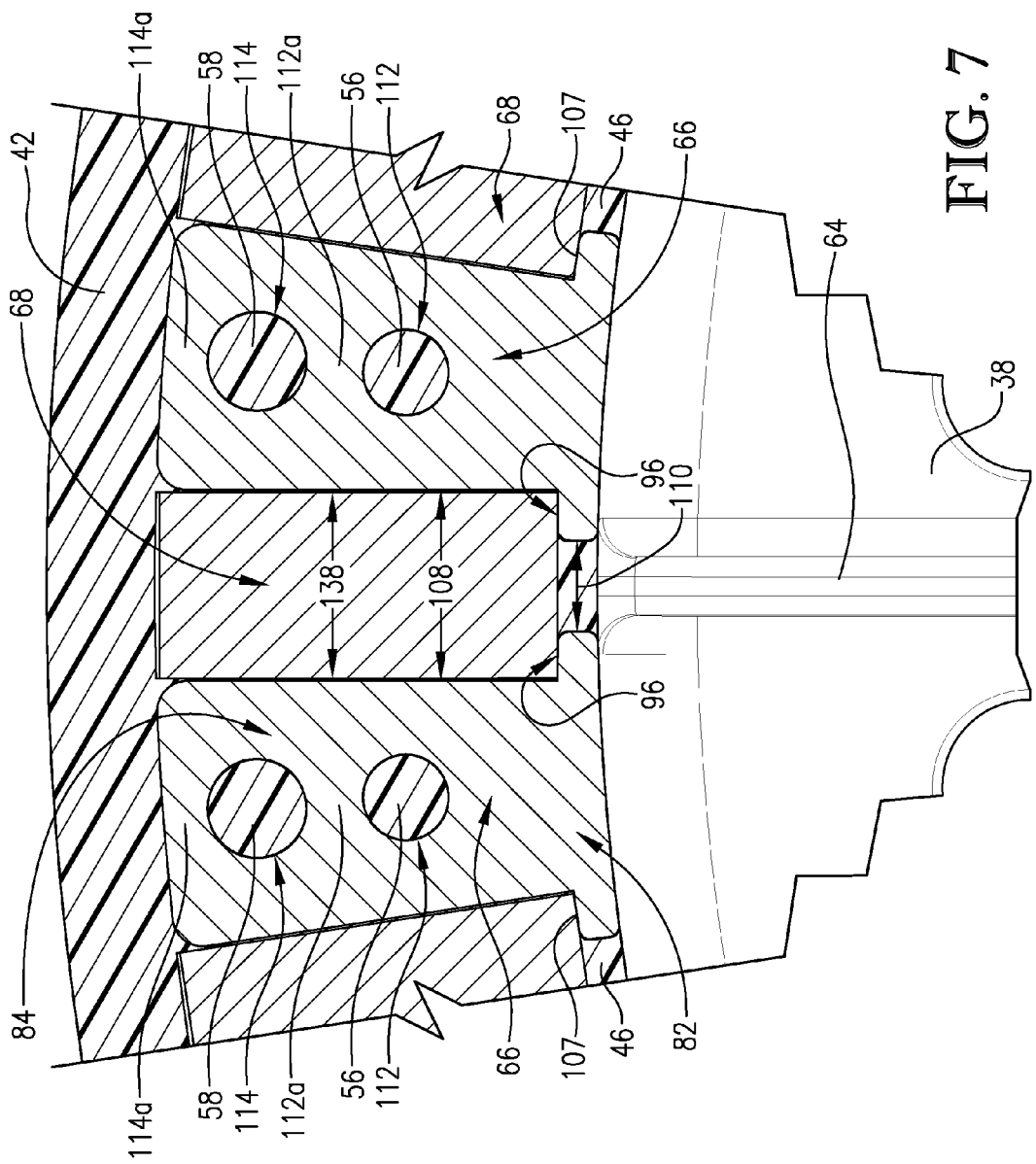
FIG. 7 is a partially sectioned top view of a part of the rotor portion of FIGS. 2 and 3, particularly illustrating the relative dimensions and spacing of the pole segments and magnets.

Preferably, each pole segment 66 includes a first generally arcuately extending wall structure 112a positioned radially outside of and in part defining the inner positioning hole 112. Furthermore, each pole segment 66 preferably includes a second generally arcuately extending wall structure 114a positioned radially outside of and in part defining the outer positioning hole 114. As best illustrated in FIG. 7, the second wall structure 114a may also in part define the outer positioning hole 112.

Preferably each of the wall structures 112a, 114a extends continuously, such that the positioning holes 112, 114 are closed and spaced both from each other and from the corresponding radially outermost face 102. However, as will be discussed in greater detail below, it is permissible according to some aspects of the present invention for one or more discontinuous wall structures to be provided such that multiple positioning holes are interconnected and/or one or more positioning holes intersect the radially outmost face and/or the radially innermost face so as to be non-enclosed.

Although the positioning holes 112,114 and, in turn, the positioning pegs 56,58 may suitably have an axially constant circular cross-sectional shape and size (the cross-section being taken transverse to the longitudinal axis of the respective peg), as illustrated, it is within the scope of the present invention for the holes 112,114 to be of any suitable cross-sectional shape or to present an axially varying cross-sectional shape or size. For instance, the positioning holes could be configured as rectangular prisms or be oval in cross-section; they could be triangular in cross-section at the upper face 86 and circular in cross-section at the lower face 88; or they could be large in circular cross-sectional diameter at the upper face 86 and small at the lower face 88 such that an inverted conical space is defined. Furthermore, the holes might be generally trapezoidal in shape in keeping with the shape of the radially outermost sections 84.

It is also acceptable for the positioning holes 112 to have a different cross-sectional shape and/or size than the positioning holes 114 and/or for the cross-sectional shape and/or size to vary among the positioning holes 112 and/or among the positioning holes 114. All of the positioning holes 112 could be circular in cross-section, for instance, while all of the positioning holes 114 could be square in cross-section. Alternatively, the positioning holes 112 and/or the positioning holes 114 could alternate between circular and rectangular cross-sections from one pole segment to the next.

Furthermore, although each pole segment 66 is shown having a pair of positioning holes 112,114 formed therethrough, it is within the scope of the present invention for one or more of the pole segments to include a single positioning hole or more than two positioning holes. Even further, positioning holes may be excluded entirely from some or all of the pole segments. For instance, first and second adjacent pole segments could present one and two positioning holes, respectively. As will be discussed in greater detail below, if only a single positioning hole is provided in a given pole segment, it is preferable that the hole be positioned nearer to the radially outermost face than to the radially innermost face.

As also illustrated in FIG. 4 and others, the windows 52 formed in the inner support wall 44 during the molding process allow the radially innermost face 90 of each pole segment 66 to be exposed after completion of the rotor can 34 molding process, with the columns 46 and the radially innermost faces 90 preferably forming an at least substantially continuous inner circumferential surface 116. The gap 20 (see FIG. 1) is defined between the stator 18 and the inner circumferential surface 116.

Although the positioning pegs 56,58 restrict movement of the pole segments 66 in the manner described above, it is preferred that the pole segments 66 be additionally restricted against radial movement by the outer support wall 42; against circumferential movement by the adjacent dividers 54, wherein the dividers 54 are formed by inflow of the rotor can material into the original spaces between the magnets 68 and the chamfered corners 104,106 of the pole segments 66; and against both radial and circumferential movement by the columns 46. With further regard to the latter, it is preferred that an axially extending groove 118 is formed in each circumferential side of a given support column 46 in order to receive and wrap around the side edges 92,94 of the adjacent radially innermost section 82 to partially overlie the intermediate face 96 and the radially innermost face 90 of the respective radially innermost section 82.

Turning to FIGS. 4 and 6, each magnet 68 is preferably shaped as a rectangular prism or block so as to present an inner face 120; an outer face 122; an upper face 124; a lower face 126; and side faces 128 and 130, respectively. However, deviations from the illustrated shape may be made without departing from the spirit of the present invention.

As shown in FIG. 4, each magnet 68 is positioned within a slot 132 cooperatively defined by adjacent pairs of pole segments 66 (and, more particularly, the side and intermediate faces 96, 98, and 100); the corresponding pair of dividers 54; and the outer and inner support walls 42 and 44, respectively.

As best shown in FIG. 6, the magnets 68 are preferably evenly spaced from each other along an arcuate path. A maximum magnet spacing distance 134 is defined between adjacent side faces 128,130 near the outer faces 122 of adjacent magnets 68. A minimum magnet spacing distance 136 is defined between adjacent side faces 128,130 near the inner faces 120 of adjacent magnets 68. Furthermore, it is preferable that the width 138 (in a substantially circumferential direction) of each magnet 68 be smaller than both the maximum magnet spacing distance 134 and the minimum magnet spacing distance 136. Also, as most clearly illustrated in FIG. 7, the width 138 of each magnet 68 is at least substantially equal to the maximum spacing distance 108, such that each magnet 68 is wider than the spacing dimension 110 and abuts or nearly abuts the radially adjacent shelves 97 (and intermediate faces 96). Preferably, the sizing of the pole segments 66 and the magnets 68 is such that gaps therebetween are minimized. Such gaps will likely exist due to manufacturing limitations, however. The gaps may be air filled or filled with plastic or another material without departing from the scope of the present invention. Gaps may also be intentionally provided without departing from the scope of the present invention, although such an arrangement is not as desirable as a gapless (or nearly gapless) arrangement.

Although the above dimensional relationships are preferred in accordance with the first preferred embodiment of the present invention, variations from such relationships are permissible without departing from the scope of the present invention. The magnets might be unevenly spaced for instance, be of varying widths, or be sized in such a manner as to define distinct gaps relative to the adjacent pole segments.

Each of the magnets 68 is preferably a grade six (6) ferrite, neodymium, or ceramic magnet. The magnets are preferably each of the same composition and grade, although variation between magnets is permissible without departing from the scope of the present invention. It is also possible that more than one of the above-named materials or multiple grades of one or more of the above-named materials might be contained in the same magnet. Use of other magnetic materials and/or grades is also within the ambit of the present invention.

Although charging of the magnets 68 may be accomplished at any time deemed convenient, provision of a plastic or otherwise non-magnetically conductive rotor can 34 enables charging or re-charging of the magnets 68 after completion of the molding of the rotor can 34 or, even further, after the rotor 16 is assembled in its entirety.

Preferably, the number of pole segments 66 is equivalent to the number of permanent magnets 68, with that number being further equivalent to the number of poles of the motor 10. In the illustrated first embodiment, for instance, forty-two (42) pole segments 66 and forty-two (42) permanent magnets 68 are provided.

Although it is preferable for the rotor can 34 to be formed via an overmolding process by which the rotor can 34 encompasses the pole segments 66 and the magnets 68, it is within the scope of the present invention for the rotor can to be formed in more than one part and/or to be formed prior to insertion of the pole segments 66 and magnets 68. For instance, the entire rotor can except for the top wall could be one integrally molded piece, with the pole segments 66 and the magnets 68 being put into place relative to pre-formed pegs, dividers, columns, and windows. The top wall could then be adhered or otherwise secured into place.

In a similar variation, a pre-formed rotor can could be provided in which the pegs are not integral with the can but instead are discrete and connected to the floor of the can via a press fit, adhesives, interengaging threads, or any of a variety of connection means known in the art. One such variation will be discussed in greater detail below.

It will be appreciated that the inventive spoked rotor design described herein is particularly effective in focusing or concentrating the magnetic flux. More specifically, for a given one of the magnets 68, the flux travels in at least substantially circumferentially opposite directions into each of the adjacent pole segments 66. The pole segments 66 then serve to redirect the flux in a radially inward direction.

Although it is feasible for the motor to be operable even if adjacent pole segments are in contact with each other, such contact would lead to "shorting" of the magnetic circuit. As a result, the flux would not be as focused. Furthermore, although it is feasible for the motor to be operable with the magnet polarities varying to some extent from the oppositely oriented adjacent magnets described above, such an arrangement is not believed to be as desirable.

The motor 10 described above with reference to the first preferred embodiment provides numerous advantages. In a conventional outer rotor motor, for instance, high flux density is typically achieved using higher grade magnets (e.g., grade 9 ferrite magnets) and copper wiring. To achieve similar performance using less expensive lower grade magnets and/or less expensive aluminum wiring typically requires increased stack height. In some cases, however, the allowable stack increase will be limited based on the motor envelope available for the particular machine. The flux density is thus limited based on axial space constraints. In the inventive motor, however, the outer rotor spoke design achieves higher flux density with lower grade magnets (e.g., grade six (6) ferrite magnets) and aluminum wiring without any stack increases, while still achieving performance comparable to that of a more expensive conventional design. Furthermore, although the inventive design preferably results in a larger outer diameter of the rotor, such diametrical expansion is typically more easily accommodated in the machine design than is axial expansion.

Another advantage is provided with regard to achieving both good low speed performance and good high speed performance. In particular, while use of a stack increase to achieve suitable flux density when using aluminum wiring typically achieves acceptable low speed performance, high speed performance can be degraded. To compensate, stator redesigns have been implemented to reduce the number of poles and, in turn, to reduce the frequency and high speed losses. However, such an involved approach is less than ideal.

In contrast, the present invention achieves good performance at both low and high speeds without requiring stator redesign. This is particularly advantageous in washing machine applications, wherein a low speed and high torque are required at start-up and during at least part of the washing phase, and a high speed is required at spin.

Yet another advantage provided by the above-described design is increased inductance without increased turns of the wiring, due to the presence of the pole segments 66. Such increased inductance enables a higher advance angle at high speed and, in turn, enables improved motor efficiency. This also allows for a higher number of poles to be used, resulting in improved demagnetization capability and improved lower speed performance.

Even further, improved sound characteristics may be provided by a motor configured in the manner described above.

Turning now to FIGS. 8-11, a second preferred embodiment is illustrated. It is initially noted that, with certain exceptions to be discussed in detail below, many of the elements of the rotor portion 210 of the second embodiment are the same as or very similar to those described in detail above in relation to the rotor portion 32 of the first embodiment. Therefore, for the sake of brevity and clarity, redundant descriptions and numbering will be generally avoided here. Unless otherwise specified, the detailed descriptions of the elements presented above with respect to the first embodiment should therefore be understood to apply to the second embodiment, as well. Furthermore, it should be understood that the rotor portion 210 of the second illustrated embodiment could suitably be placed in an environment similar to that shown in FIG. 1 or any of the other alternative environments (e.g., electric scooters, etc.) previously described.

Figure 10:
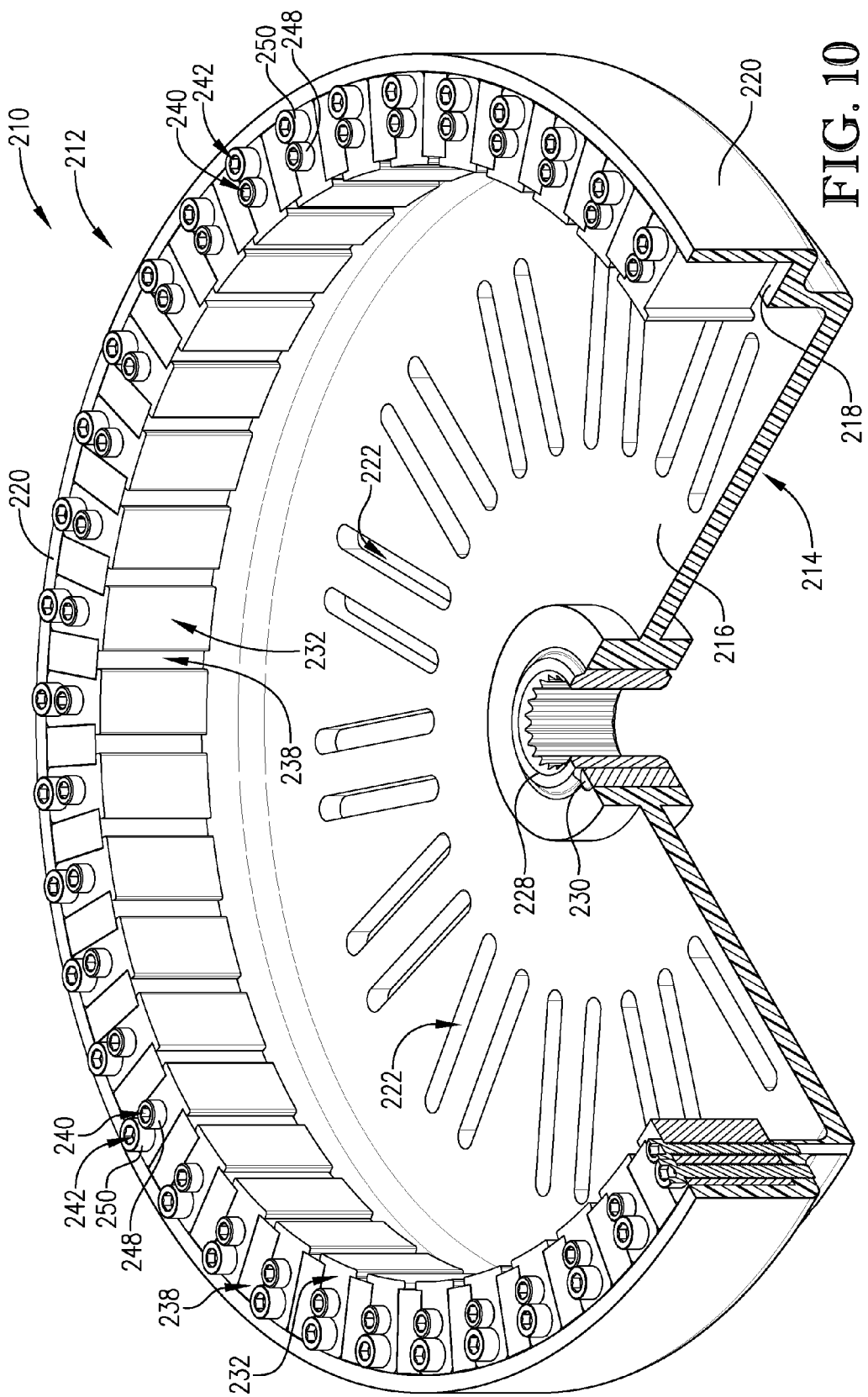
FIG. 10 is a partially sectioned view of the rotor portion of FIGS. 8 and 9, particularly illustrating the means of spacing and securing the pole segments and magnets.

As shown in FIGS. 8 and 9, a rotor portion 210 is provided that includes a rotor can 212 including a radially projecting base 214. The base 214 preferably includes a central plate 216 and, as best shown in FIG. 10, an annular elevated floor 218. The rotor can 212 further includes a circumferentially extending outer support wall 220 projecting axially upwardly from the floor 218. In the illustrated second embodiment, the central plate 216 includes a plurality of radially extending ventilation slots 222. Furthermore, the floor 218 preferably includes a plurality of arcuately spaced inner fastener-receiving holes 224 and a plurality of arcuately spaced outer fastener-receiving holes 226, with both sets of holes 224,226 extending through the floor 218. Preferably, the inner and outer fastener-receiving holes 224,226 are threaded, although non-threaded holes are allowable within the scope of the present invention.

The rotor can 212 of the second preferred embodiment preferably comprises aluminum, although any one or more of a variety of materials may be used.

As shown in FIGS. 8-10, the second illustrated embodiment includes a coupler 228 for connection of the rotor can 212 to a rotor shaft (not shown). The coupler 228 of the second illustrated embodiment is secured through use of a press fit augmented with an interference screw 230.

Preferably, the pole segments 232 of the second illustrated embodiment are configured in the same manner as the pole segments 66 of the first illustrated and include inner and outer positioning holes 234 and 236, respectively. Similarly, the magnets 238 of the second illustrated embodiment are preferably configured in the same manner as the magnets 68 of the first illustrated embodiment. However, it is to be understood that any potential variants in pole segment or magnet construction described or implied above in relation to the pole segments 66 or magnets 68 of the first embodiment apply likewise to the pole segments 232 and/or magnets 238 of the second embodiment.

In contrast to the overmolding and resultant formation of positioning structures such as pegs 56,58 and dividers 54 described in relation to the first embodiment, the pole segments 232 of the second illustrated embodiment are preferably secured in the rotor can 212 by a plurality of discrete inner and outer fasteners 240 and 242, respectively, that correspond both to the inner and outer positioning holes 234,236 and to the inner and outer fastener-receiving holes 224,226. Preferably, each of the fasteners 240,242 is threaded so as to interengage with the threads (not shown) of the fastener-receiving holes 224,226. Furthermore, each fastener 240 or 242 preferably presents an end 244 or 246, respectively, that is substantially flush with the rotor can 212 when the fasteners 240,242 are in place. However, the fasteners 240,242 may be of a variety of lengths and may be partially threaded or non-threaded. Furthermore, securement of the fasteners 240,242 in the fastener-receiving holes 224,226 can be through any means known in the art, including but not limited to use of adhesives, epoxies, or nuts. It is also within the scope of the present invention for the inner and outer positioning holes 234,235 to be threaded.

Although the fasteners 240,242 are shown having a circular cross-sectional shape, it is within the scope of the present invention for the fasteners 240,242 to be of any suitable cross-sectional shape and size or to present an axially varying cross-sectional shape or size in conformance with any variations in the cross-sectional shape and/or size of the positioning holes 234,236. Several potential variations have been discussed above with regard to the positioning holes 112,114 and positioning pegs 56,58 of the first embodiment. The previously discussed variations are to be understood as being generally applicable to the second embodiment, as well, with the fasteners 240,242 being analogous to the positioning pegs 56,58, respectively.

Furthermore, as discussed previously with respect to the first embodiment, it is to be understood that one or more of the pole segments may include a single positioning hole or more than two positioning holes. Even further, according to some aspects of the present invention, positioning holes may be excluded entirely from some of the pole segments. Preferably, the number of and location of the fasteners 240,242 will correspond to the number of and location of the positioning holes.

It is also within the scope of the present invention for the shapes, sizes, and positions of the fastener-receiving holes 224,226 to vary from those shown in the illustrated second embodiment in order to receive alternatively configured or arranged fasteners 240,242.

With continued regard to the fasteners 240,242, each fastener 240,242 preferably includes a head 248,250, respectively, having at least one dimension larger than the largest cross-sectional dimension of the associated positioning hole 234,236. Such sizing will ensure a controlled depth of extension of the fasteners 240,242 into the positioning holes 234, 236 and the fastener-receiving holes 224,226.

Although the pole segments 232 are preferably secured to the rotor can 212 by the fasteners 240,242, other securement means, including but not limited to press fits, adhesives, or alternatively configured fasteners, fall within the scope of the present invention. For instance, discrete fasteners might be provided that connect directly to the can via clips, adhesives, or other means rather than being threadably or otherwise inserted into fastener-receiving holes formed in the can.

Furthermore, the magnets 238 may be secured to the rotor can 212 and between the pole segments 232 by any suitable means, including but not limited to press fits (as shown), adhesives, or fasteners.

The advantages conferred by the second illustrated embodiment are at least substantially similar to those described above with regard to the first preferred embodiment and therefore will not be discussed separately herein.

A third preferred embodiment is illustrated in FIG. 12. It is initially noted that, with certain exceptions to be discussed in detail below, many of the elements of the rotor portion 310 of the third embodiment are the same as or very similar to those described in detail above in relation to the rotor portion 32 of the first embodiment. Therefore, for the sake of brevity and clarity, redundant descriptions and numbering will be generally avoided here. Unless otherwise specified, the detailed descriptions of the elements presented above with respect to the first embodiment should therefore be understood to apply to the third embodiment, as well. Furthermore, it should be understood that the rotor portion 310 of the third illustrated embodiment could suitably be placed in an environment similar to that shown in FIG. 1 or any of the other alternative environments (e.g., electric scooters, etc.) previously described.

As shown in FIG. 12, a rotor portion 310 is provided that includes a rotor can 312 supporting pole segments 314 and magnets 316. Each of the pole segments 314 preferably includes a radially innermost portion 318 and a radially outermost portion 320.

A positioning hole 322 is preferably formed in each of the radially outermost portions 320. The pole segments 314 each preferably include generally arcuately extending wall structure 324 positioned radially outside of and in part defining the corresponding positioning hole 322.

Preferably, the wall structure 324 presents a generally radial open slot 326, with corresponding ones of the slots 326 and the positioning holes 322 being interconnected.

As shown in FIG. 12, each of the positioning holes 322 preferably presents a maximum positioning hole dimension in a generally arcuate direction, while each of the slots 326 presents a constant slot dimension in a corresponding generally arcuate direction. Preferably, the maximum positioning hole dimensions are greater than the corresponding slot dimensions, with corresponding ones of the slots and positioning holes cooperatively forming keyholes 328 in the pole segments 314. Such relative dimensions preferably aid in preventing radially inward shifting of the pole segments 314.

It is permissible according to some aspects of the present invention, however, for the slot and maximum positioning hole dimensions to vary from those described above. For instance, each slot might present dimensions that vary with radial position, and one or more of these slot dimensions might be larger than the corresponding opening dimension. For instance, the slot might be configured as a portion of a triangle. In such a configuration, the base might be positioned radially outwardly from the positioning hole and have a dimension greater than the maximum positioning hole dimension, while the regions of the slot defined by the upper portion of the triangle and positioned nearer or even adjacent the positioning hole might have dimensions smaller than the maximum positioning hole dimension. Radially inward shifting is thus restricted.

Ultimately, although any of a variety of dimensional relationships between the slots and the positioning holes are permissible within the scope of some aspects of the present invention, it is preferred that at least the minimum generally arcuate dimension of each slot is smaller than the corresponding maximum positioning hole dimension.

Among other things, provision of the slots 326 in addition to the positioning holes 322 enables a decrease in the weight of each pole segment 314 and, in turn, a decrease in the overall weight of the rotor portion 310 and motor as a whole.

Each of the radially innermost portions 318 preferably presents a radially innermost face 330, while each of the radially outermost portions preferably presents a radially outermost face 332. Each of the slots 326 preferably extends to the radially outermost face 332. Furthermore, it is preferable that each of the positioning holes 322 is positioned nearer to the radially outermost face than to the radially innermost face. Such slot and positioning hole positioning preferably enables a decreased impact on the flow of magnetic flux through each pole segment 314.

Preferably, the rotor can 312 is overmolded, with the rotor can material flowing into the keyholes 328 during the overmolding process to form positioning pegs 334 that are integral with the can 312. It is noted, however, that it is permissible within the scope of some aspects of the present invention for a non-overmolded can and discrete fasteners to be provided in conjunction with pole pieces defining keyholes therethrough. In such a case, the detailed descriptions of the elements presented above with respect to certain aspects of the second embodiment should be understood to apply to the third embodiment, as well.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention.

What is claimed is:

1. An electric motor comprising:
a stator; and
a rotor rotatable about an axis and spaced at least in part radially outside the stator,
said rotor including—
a plurality of arcuately spaced apart pole segments,
each of said pole segments defining an opening therethrough and including a generally arcuately extending wall structure positioned radially outside of and at least in part defining the opening,
a plurality of arcuately spaced apart magnets alternately arranged with the pole segments such that each of the pole segments is positioned between an adjacent pair of the magnets,
a rotor can at least in part supporting the pole segments and the magnets, and
a plurality of pegs each extending through a corresponding one of the openings to secure a corresponding one of the pole segments relative to the can.

2. The electric motor of claim 1,
each of said wall structures presenting a generally radial open slot,
corresponding ones of said slots and said openings being interconnected.

3. The electric motor of claim 2,
each of said slots presenting a minimum slot dimension in a generally arcuate direction, each of said openings having at least a portion thereof that is larger in the generally arcuate direction than the minimum slot dimension, said slot and said opening cooperatively forming a keyhole.

4. The electric motor of claim 2, each of said pole segments presenting a radially outermost face, each of said slots extending to a corresponding one of the radially outermost faces.

5. The electric motor of claim 4, each of said pegs being integrally formed with the can.

6. The electric motor of claim 5, said rotor can and pegs comprising plastic overmolded over and around the pole segments and the magnets.

7. The electric motor of claim 6, said plastic comprising polypropylene.

8. The electric motor of claim 1, each of said pole segments presenting a radially outermost face, each of said wall structures extending continuously so that the opening is closed and spaced from the radially outermost face.

9. The electric motor of claim 1, each of said pegs being a discrete fastener secured to the can.

10. The electric motor of claim 1, said rotor can comprising aluminum.

11. The electric motor of claim 1, each of said openings presenting a transverse cross-section having a shape and size that are at least substantially constant in an axial direction.

12. The electric motor of claim 1, said openings being uniform.

13. The electric motor of claim 1, each of said pole segments further defining a second opening therethrough, said second opening being radially spaced from the first opening.

14. The electric motor of claim 1, said magnets comprising ferrite and/or neodymium.

15. The electric motor of claim 1, adjacent ones of said magnets presenting oppositely oriented polarities.

16. The electric motor of claim 15, each of said polarities being oriented generally perpendicular to an associated radial direction.

17. The electric motor of claim 1, each of said pole segments comprising a magnetically conductive material.

18. The electric motor of claim 17, each of said pole segments comprising steel.

19. The electric motor of claim 1, each of said pole segments presenting a radially innermost face and a radially outermost face, each of said openings being positioned closer to the corresponding outermost face.

20. The electric motor of claim 1, each of said pole segments comprising—
a body including radially outermost and innermost sections,
said outermost section presenting a pair of spaced apart side faces,
said innermost section projecting arcuately relative to each of the side faces to form a pair of spaced apart shelves.

21. The electric motor of claim 20, each of said bodies being trapezoidal in shape.

22. The electric motor of claim 20, said pole segments being at least substantially evenly spaced apart along an arcuate path, said pole segments defining a spacing distance between adjacent ones of the side faces of each adjacent pair of bodies, each of said shelves presenting an outermost side edge spaced from a corresponding one of the side faces, said pole segments defining a spacing dimension between adjacent ones of the side edges of each adjacent pair of shelves, said spacing dimension being less than said spacing distance.

23. The electric motor of claim 22, each of said magnets presenting a magnet width in an at least substantially arcuate direction that is at least substantially equal to the spacing distance.

24. The electric motor of claim 23, each of said magnets radially abutting one of the shelves of each adjacent one of the pole segments.

\* \* \* \* \*